(12) United States Patent
Rao

(10) Patent No.: US 7,873,327 B2
(45) Date of Patent: Jan. 18, 2011

(54) METHOD FOR ADAPTIVELY CONTROLLING OTHER CELL INTERFERENCE

(75) Inventor: Anil M Rao, Cedar Knolls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1119 days.

(21) Appl. No.: 11/507,874

(22) Filed: Aug. 22, 2006

(65) Prior Publication Data

US 2008/0051096 A1 Feb. 28, 2008

(51) Int. Cl.
*H04W 88/02* (2009.01)

(52) U.S. Cl. ...................................... 455/69

(58) Field of Classification Search ............. 455/456.1, 455/456.2, 509, 522, 442, 453, 454, 456.3, 455/456.4, 456.5, 456.6, 69; 370/329, 331, 370/350, 485, 491, 496, 500, 503, 508, 521, 370/543
See application file for complete search history.

(56) References Cited

U.S. PATENT DOCUMENTS

| | | | | |
|---|---|---|---|---|
| 5,475,870 A * | 12/1995 | Weaver et al. | ............. | 455/67.11 |
| 6,236,365 B1 * | 5/2001 | LeBlanc et al. | ............. | 342/457 |
| 6,400,335 B1 * | 6/2002 | Weaver et al. | ............... | 343/853 |
| 6,522,881 B1 * | 2/2003 | Feder et al. | .................. | 455/437 |
| 2003/0123425 A1 * | 7/2003 | Walton et al. | ................ | 370/341 |
| 2004/0242257 A1 * | 12/2004 | Valkealahti et al. | ......... | 455/522 |
| 2005/0124369 A1 * | 6/2005 | Attar et al. | ................... | 455/522 |
| 2006/0094363 A1 * | 5/2006 | Kang et al. | ................ | 455/63.1 |
| 2008/0081564 A1 * | 4/2008 | Rao | .......................... | 455/63.1 |
| 2008/0233958 A1 * | 9/2008 | Robbins et al. | ............. | 455/436 |

* cited by examiner

*Primary Examiner*—Diane Mizrahi
(74) *Attorney, Agent, or Firm*—John Ligon

(57) ABSTRACT

Disclosed is a method of controlling a transmit power constraint at a mobile station using a pilot power ratio (PPR) or other measurement of relative received powers (or signal strengths) between a neighbor cell transmission and a serving cell transmission such that other-cell interference produced by the mobile station may be managed. The transmit power constraint may, for example, correspond to a total or per sub-carrier maximum allowable mobile station transmit power. The transmit power constraint may be decreased if an adjacent neighbor cell, or an adjacent neighbor cell with a strongest pilot signal strength at the mobile station, is interference overloaded, i.e., interference levels in the adjacent neighbor cell is above a threshold interference level. Such decrease may be based on a pilot power ratio between a received pilot power of the overloaded adjacent neighbor cell at the mobile station and a received pilot power of the serving cell at the mobile station. Conversely, the transmit power constraint may be decreased if at least one adjacent neighbor cell, or the adjacent neighbor cell with the strongest pilot signal strength at the mobile station, is not interference overloaded. Such increase may be based on a pilot power ratio between a received pilot power of the adjacent neighbor cell with the strongest pilot signal strength at the mobile station and a received pilot power of the serving cell at the mobile station.

11 Claims, 3 Drawing Sheets

METHOD FOR ADAPTIVELY CONTROLLING OTHER CELL INTERFERENCE

FIELD OF THE INVENTION

The present invention relates generally to wireless communication systems and, in particular, to controlling reverse link transmit power in a wireless communication system.

BACKGROUND OF THE RELATED ART

Universal Mobile Telecommunication System (UMTS) is migrating from a Code Division Multiple Access (CDMA) based air interface to an Orthogonal Frequency Division Multiple Access (OFDMA) based air interface in order to increase reverse link capacity. Reverse link capacity can be increased by limiting interference caused by mobile stations within a same cell (also referred to herein as "in-cell interference") or by mobile stations in other cells (also referred to herein as "other-cell interference").

In-cell and outer-cell Interference are caused, in part, when mobile stations transmit over a same carrier or sub-carrier frequency simultaneously. In a CDMA system, i.e., wireless communication system utilizing a CDMA air interface, mobile stations produces both in-cell interference and other-cell interference because mobile stations in the same cell and in different cells are simultaneously transmitting on a same carrier frequency. In-cell interference is the main source of interference in a CDMA system. By contrast, the main source of interference in an OFDMA system, i.e., wireless communication system utilizing an OFDMA air interface, is other-cell interference. In an OFDMA system, mobile stations in the same cell transmit on different sub-carrier frequencies and, thus, the in-cell interference produced by the mobile stations should be insignificant. However, other-cell interference is still produced because mobile stations in different cells may be simultaneously transmitting on the same sub-carrier frequencies. Accordingly, OFDMA systems have higher reverse link capacity than CDMA systems because mobile stations in an OFDMA system produce less in-cell interference than mobile stations in a CDMA system.

In order to increase reverse link capacity in an OFDMA system, other-cell interference needs to be reduced. However, prior art techniques for managing interference tend to focus on managing in-cell interference. Accordingly, there exists a need for a method of managing other-cell interference in a wireless communication system.

SUMMARY OF THE INVENTION

An embodiment of the present invention is a method of controlling a transmit power constraint at a mobile station using a pilot power ratio (PPR) or other measurement of relative received powers (or signal strengths) between a neighbor cell transmission and a serving cell transmission such that other-cell interference produced by the mobile station may be managed. The transmit power constraint may, for example, correspond to a total or per sub-carrier maximum allowable mobile station transmit power. The transmit power constraint may be decreased if an adjacent neighbor cell, or an adjacent neighbor cell with a strongest pilot signal strength at the mobile station, is interference overloaded, i.e., interference levels in the adjacent neighbor cell is above a threshold interference level. Such decrease may be based on a pilot power ratio between a received pilot power of the overloaded adjacent neighbor cell at the mobile station and a received pilot power of the serving cell at the mobile station. Conversely, the transmit power constraint may be decreased if at least one adjacent neighbor cell, or the adjacent neighbor cell with the strongest pilot signal strength at the mobile station, is not interference overloaded. Such increase may be based on a pilot power ratio between a received pilot power of the adjacent neighbor cell with the strongest pilot signal strength at the mobile station and a received pilot power of the serving cell at the mobile station.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
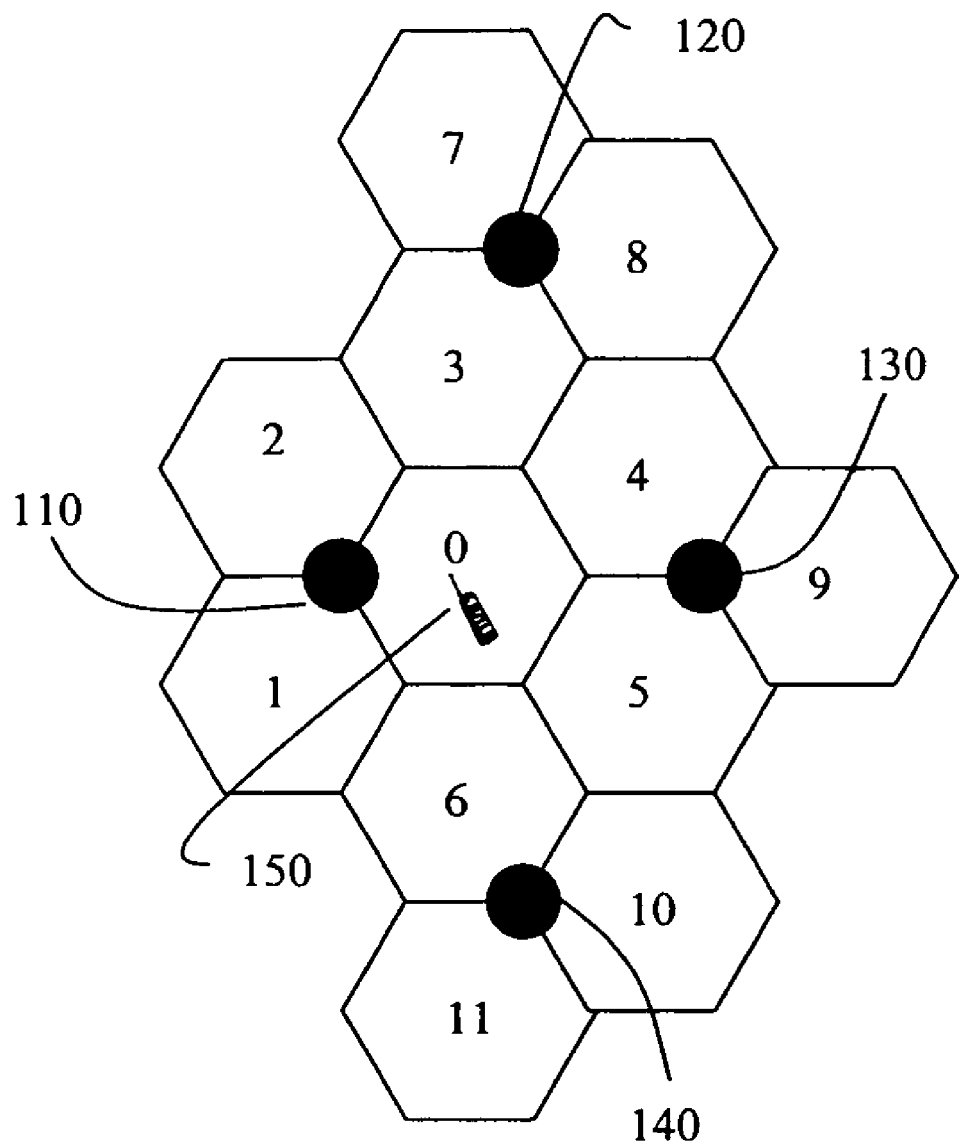
FIG. 1 depicts a wireless communication system used in accordance with the present invention.

For purposes of illustration, the present invention will be described herein with reference to a wireless communication system utilizing an Orthogonal Frequency Division Multiple Access (OFDMA) air interface based on the well-known Universal Mobile Telecommunication System standard. FIG. 1 depicts a wireless communication system 100 comprising base stations 110, 120, 130 and 140 and at least one mobile station 150. Each base station 110, 120, 130 and 140 is associated with a geographical coverage area comprising a plurality of cells or sectors. Specifically, base station 110 is associated with cells 0, 1 and 2; base station 120 is associated with cells 3, 7 and 8; base station 130 is associated with cells 4, 5 and 9; and base station 140 is associated with cells 6, 10 and 11. Mobile station 150 is being served by cell 0.

Each base station serves mobile stations within its respective cells using a same set of orthogonal sub-carrier frequencies. The set of orthogonal sub-carrier frequencies may be partitioned in terms of frequency and/or time for reverse link and forward link usage. For purposes of discussion, a sub-carrier frequency, or time segment thereof, used for a reverse link channel or a forward link channel will be referred to herein as a "reverse link sub-carrier" and a "forward link sub-carrier," respectively, wherein a reverse link channel comprises one or more reverse link sub-carriers and a forward link channel comprises one or more forward link sub-carriers.

Reverse link channels include traffic channels and control channels, and forward link channels include pilot channels, broadcast channels, control channels and traffic channels. Reverse link traffic channels are assigned to mobile stations by a scheduling entity (also referred to herein as a "scheduler") at the base station. A message referred to as a "scheduling grant" indicates to the mobile stations, among other things, the reverse link channel (or associated sub-carriers) being assigned and, perhaps, a maximum transmit power spectral density (Max_TPSD) constraint corresponding to a maximum allowable mobile station transmit power for each of the sub-carriers of the assigned reverse link. The scheduling grant is transmitted over a forward link control channel.

Each base station 110, 120, 130 and 140 transmits a known sequence of bits, i.e., pilot signal, over the pilot channel in each of its associated cells. The pilot channel for each cell in a set of adjacent cells is defined using a different set of (one or more) forward link sub-carriers, wherein a set of adjacent cells comprises a serving cell and a plurality of neighbor cells which are adjacent to the serving cell. For example, a set of adjacent neighbor cells may comprise of serving cell 0 and adjacent neighbor cells 1-6. The forward link sub-carriers used to define the pilot channel in cell 0 would be different from the forward link sub-carriers used to define the pilot channels in cells 1-6. Similarly, the forward link sub-carriers used to define the pilot channel in cell 1 would be different from the forward link sub-carriers used to define the pilot channels in cells 0 and 2-6, and so on.

Figure 2:
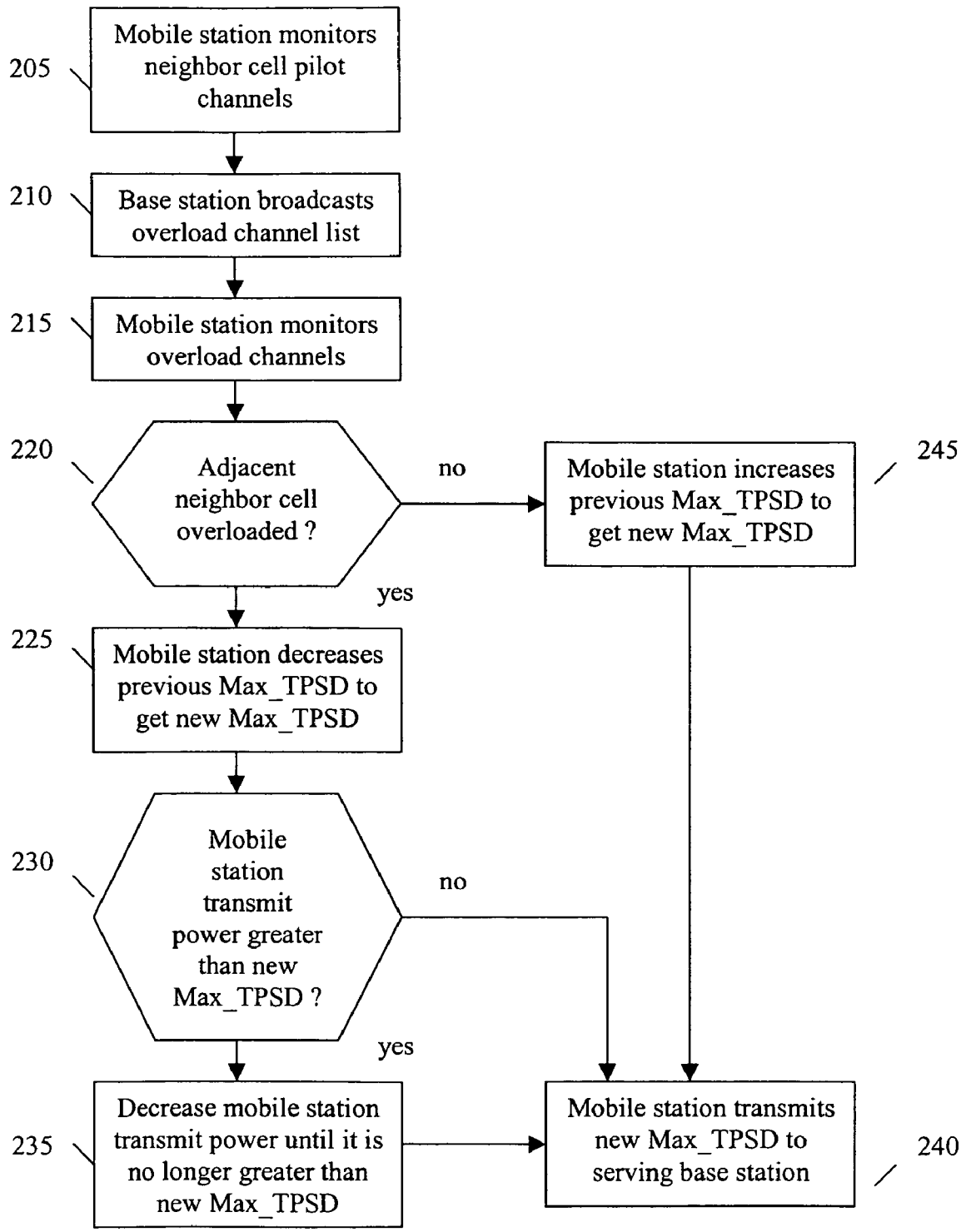
FIG. 2 depicts a flowchart illustrating an adaptive interference control used in accordance with a first embodiment of the present invention.

Wireless communication system 100 may be configured with an adaptive interference control technique or protocol for managing other-cell interference using measurements of the pilot signal strengths, i.e., pilot power. FIG. 2 depicts a flowchart 200 illustrating an adaptive interference control method used in accordance with a first embodiment of the present invention. In this embodiment, information indicative of whether a cell is interference overloaded, i.e., interference level in the cell is above a threshold interference level, is communicated to mobile station 150. Such overload information is then used to determine whether an adjustment should be made to the maximum transmit power spectral density (Max_TPSD) constraint. In another embodiment, the adjustment may be made to some other mobile station transmit power constraint, such as a constraint relating to a total maximum allowable mobile station transmit power or to actual mobile station transmit power.

In step 205, mobile station 150 is in a call and is monitoring the pilot channels of its neighbor cells, i.e., measuring pilot signal strengths of neighbor cells. While mobile station 150 is in the call, its transmit power is continuously being adjusted in accordance with well-known power control techniques and limited by the Max_TPSD constraint.

In step 210, serving base station 110 transmits, over a broadcast channel (or some other communication channel, such as a control channel) in cell 0, an overload channel list indicating overload channels for at least the adjacent neighbor cells, e.g., cells 1-6. The overload channels can be, for example, a broadcast channel or control channel over which overload information is transmitted by at least the adjacent neighbor cells. The overload information may be a flag or other message indicating whether the associated cell is interference overloaded. Like the pilot channel, the overload channel for each cell in the set of adjacent cells is defined using a different set of (one or more) forward link sub-carriers.

In step 215, mobile station 150 monitors the overload channels indicated by the overload channel list. In step 220, mobile station 150 determines whether any adjacent neighbor cell is interference overloaded based on the monitored overload channels. In an alternate embodiment, mobile station 150 may only determine whether the adjacent neighbor cell with the strongest pilot signal strength at mobile station 150 is overloaded (instead of any adjacent neighbor cell).

If at least one adjacent neighbor cell is interference overloaded, then in step 225 mobile station 150 decreases its maximum transmit power spectral density (Max_TPSD) constraint based on relative received pilot powers at mobile station 150 of the overloaded adjacent neighbor cell and the serving cell. Alternately, the Max_TPSD constraint may be decreased based on relative distances mobile station 150 is from the overloaded adjacent neighbor cell and the serving cell.

Note that this relative received pilot powers (or distances) is indicative of an amount of other-cell interference a mobile station transmission produces in the overloaded adjacent neighbor cell. By using such relative received pilot powers (or distances) as a basis for decreasing the Max_TPSD constraint, the amount of other-cell interference produced by a mobile station in the overloaded adjacent neighbor cell is taken into account. For example, if the relative received pilot powers indicate that a mobile station is producing a high amount of other-cell interference in the overloaded adjacent neighbor cell, the Max_TPSD constraint can be reduced by a large amount, or vice-versa.

In one embodiment, the relative received powers (or distances) is measured using a down pilot power ratio (Down_PPR) corresponding to a ratio between a received pilot power of the overloaded adjacent neighbor cell (P_overloaded_neighbor) at mobile station 150 and a received pilot power of the serving cell (P_serving) at mobile station 150, i.e., Down_PPR=P_overloaded_neighbor/P_serving. Note that if there are more than one overloaded adjacent neighbor cell, then the overloaded adjacent neighbor cell with the strongest received pilot power at mobile station 150 (also referred to herein as "strongest overloaded adjacent neighbor cell") would be used in the Down_PPR. The Down_PPR is used to decrease the maximum mobile station transmit power Max_TPSD constraint in accordance with the following equation:

$$\text{Max\_TPSD\_current}=\text{Max\_TPSD\_previous}-\text{Down\_PPR}\times \text{Step\_Down} \quad (1)$$

where Max_TPSD_current corresponds to a new Max_TPSD constraint, Max_TPSD_previous corresponds to a previous Max_TPSD constraint, and Step_Down corresponds to a reference amount (or down step size) by which the previous Max_TPSD constraint is decreased (i.e., amount Max_TPSD constraint is adjusted down when Down_PPR=1). In an embodiment, the Max_TPSD constraint is not decreased unless the Down_PPR is above a first threshold PPR, e.g., 0.5.

In step 230, mobile station determines whether the mobile station transmit power is greater than the new Max_TPSD constraint, e.g., Max_TPSD_current. If the mobile station transmit power is greater than the new Max_TPSD constraint, then in step 235 the mobile station transmit power is decreased until it is not greater than the new Max_TPSD constraint. From step 235, or if it is determined in step 230 that the mobile station transmit power is not greater than the new Max_TPSD constraint, flowchart 200 continues to step 240 where mobile station 150 transmits a message indicating to base station 110 the new Max_TPSD constraint, for example, as part of a scheduling request message.

If it is determined in step 220 that no adjacent neighbor cell is interference overloaded, then in step 245 mobile station 150 increases the Max_TPSD constraint using relative received pilot powers of the adjacent neighbor cell with the strongest received pilot signal strength at mobile station 150 (also referred to herein as "strongest adjacent neighbor cell") and the serving cell. Alternately, the Max_TPSD may be increased based on relative distances mobile station 150 is from the strongest adjacent neighbor cell and the serving cell.

Note that this relative received pilot powers (or distances) is different from the one used to decrease the Max_TPSD constraint. This relative received pilot powers is based on the strongest adjacent neighbor cell. By using such relative received pilot powers (or distances) as a basis for increasing the Max_TPSD constraint, mobile stations farther away from their serving base station may increase its transmit power higher and achieve better throughput. Other-cell interference produced by these mobile stations is not a concern since, in this situation, none of the adjacent neighbor cells (including the strongest adjacent neighbor cell) are interference overloaded.

In one embodiment, the relative received pilot powers (or distances) is measured using an up pilot power ratio (Up_PPR) corresponding to a ratio between a received pilot power of the strongest adjacent neighbor cell (P_strongest_neighbor) at mobile station 150 and a received pilot power of the serving cell (P_serving) at mobile station 150, i.e., $$P\_strongest\_neighbor/Up\_PPR = P\_serving.$$

The Up_PPR is used to increase the maximum mobile station transmit power (Max_TPSD) constraint in accordance with the following equation:

$$Max\_TSPD\_current = Max\_TPSD\_previous + Up\_PPR \times Step\_Up \qquad (2)$$

where Step_Up corresponds to a reference amount (or up step size) by which the Max_TPSD constraint is increased (i.e., amount Max_TPSD constraint is adjusted up when Up_PPR=1). In one embodiment, the Max_TPSD constraint is not increased unless the Up_PPR is below a second threshold PPR, e.g 0.7. From step 245, flowchart 200 continues to step 240 where mobile station 150 transmits a message indicating to base station 110 the new Max_TPSD constraint, e.g., Max_TPSD_current, for example, as a part of the scheduling request.

In one embodiment, Step_Up and Step_Down are set such that Step_Up<Step_Down. In another embodiment, Step_Up and Step_Down are set such that a desired interference overshoot rate is achieved, wherein the desired interference overshoot corresponds to a desired fraction of time which interference levels in a cell (or at a base station) may exceed a particular threshold value. For example, Step_Up and Step_Down are selected in accordance with the following equation:

$$Step\_Up/Step\_Down = Inter\_Overshoot/(1-Inter\_Overshoot) \qquad (3)$$

where Inter_Overshoot corresponds to the desired interference overshoot.

Note that, in the embodiment of FIG. 2, the Max_TPSD constraint is calculated at mobile station 150 and transmitted to base station 110. In another embodiment, mobile station 150 transmits the relevant received pilot signal strength (for the strongest overloaded adjacent neighbor cell or strongest adjacent neighbor cell, for example), along with some cell identifier associating the received pilot signal strength with the respective cell, to base station 110 over a control channel, such as a scheduling request channel. Or mobile station 150 transmits the Down_PPR (for the strongest overloaded adjacent neighbor cell) or Up_PPR (for the strongest adjacent neighbor cell), along with some cell identifier associating the Down_PPR or Up_PPR with the respective cell, to base station 110 over a control channel, such as the scheduling request channel The new Max_TPSD constraint is calculated at base station 110 based on the received information and transmitted to mobile station 150 in a message, such as the scheduling grant.

Figure 3:
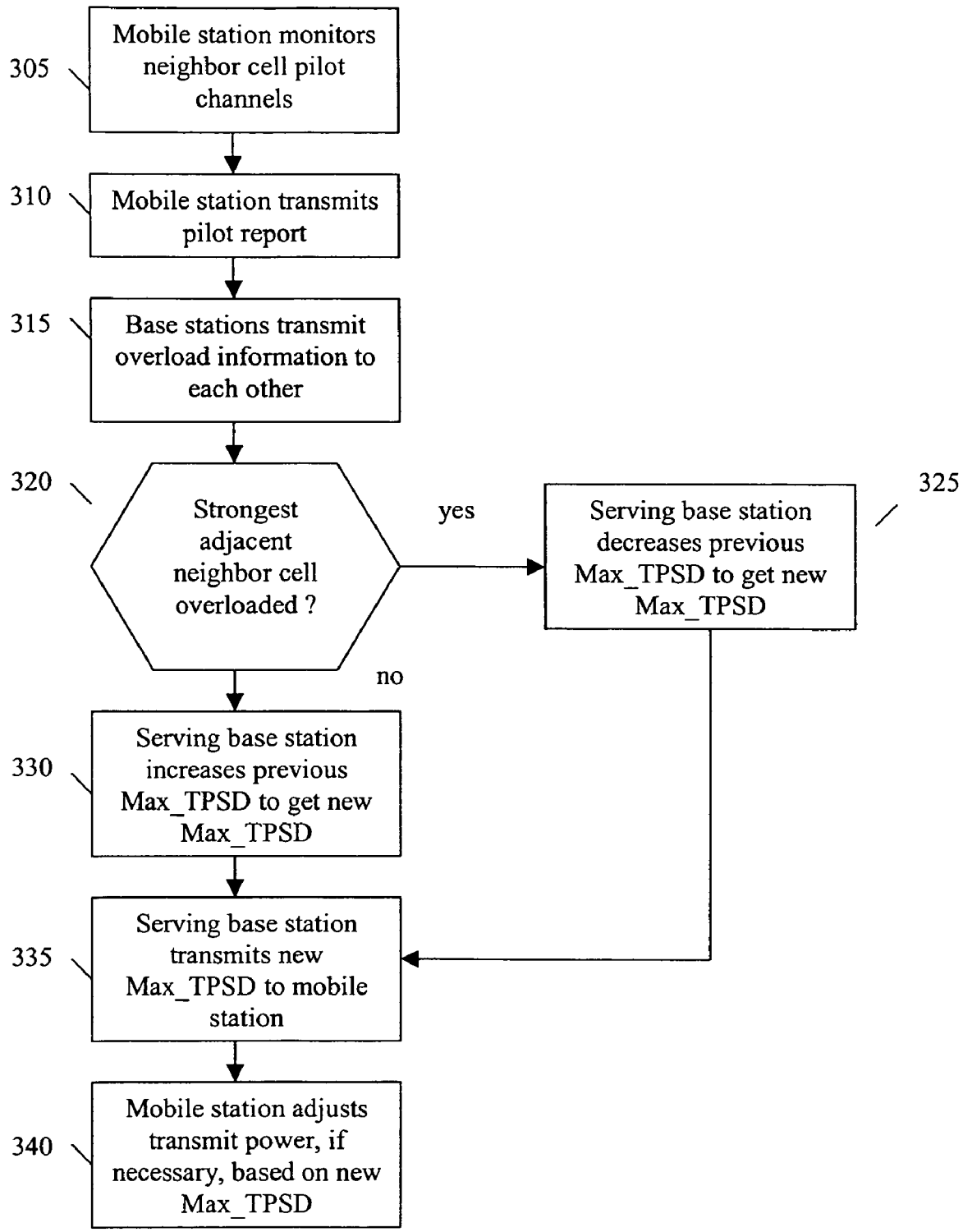
FIG. 3 depicts a flowchart illustrating an adaptive interference control used in accordance with a second embodiment of the present invention.

FIG. 3 depicts a flowchart 300 illustrating an adaptive interference control method used in accordance with a second embodiment of the present invention. In this embodiment, overload information is communicated among base stations 110, 120, 130 and 140, and used by the serving base station, i.e., base station of serving cell, to determine whether an adjustment should be made to the maximum transmit power spectral density (Max_TPSD) constraint. In another embodiment, the adjustment may be made to some other mobile station transmit power constraint, such as a constraint to a total maximum allowable mobile station transmit power, or to actual mobile station transmit power.

In step 305, mobile station 150 is in a call and is monitoring the pilot channels of its neighbor cells, i.e., measuring pilot signal strengths of neighbor cells. While mobile station 150 is in the call, its transmit power is continuously being adjusted in accordance with well-known power control techniques and limited by the maximum transmit power spectral density (Max_TPSD constraint) constraint.

In step 310, mobile station 150 transmits a pilot report indicating to its serving base station 110 the received pilot signal strengths from both the serving base station and the neighboring base stations. The pilot report may, for example, be the Event 1A, 1B, 1C, and 1D messages used in UMTS for initiating handoffs. In step 315, base stations 110, 120, 130 and 140 transmits overload information to each other indicating whether their associated cells are interference overloaded. The overload information may be transmitted periodically, transmitted only when interference overload is present, or transmitted when the current overload status of a cell has changed, e.g., overloaded cell is no longer interference overloaded or vice-versa.

In step 320, serving base station 110 determines whether the strongest adjacent neighbor cell (i.e., adjacent neighbor cell with strongest pilot signal strength at mobile station 150) is interference overloaded based on the overload information. Alternately, serving base station 110 may determine whether any adjacent neighbor cell is interference overloaded.

If the strongest adjacent neighbor cell is interference overloaded, serving base station 110 decreases the Max_TPSD constraint for mobile station 150 in step 325. The Max_TPSD constraint is decreased based on relative received pilot powers of the strongest adjacent neighbor cell and the serving cell (or based on relative distances mobile station 150 is from the strongest adjacent neighbor cell and the serving cell). For example, the Max_TPSD constraint may be decreased in accordance with the following equation:

$$Max\_TPSD\_current = Max\_TPSD\_previous - PPR2 \times Step\_Down \qquad (4)$$

where PPR2 corresponds to a ratio between a received pilot power of the strongest adjacent neighbor cell (P_strongest_neighbor) at mobile station 150 and a received pilot power of the serving cell (P_serving) at mobile station 150, i.e., Down_PPR=P_strongest_neighbor/P_serving. In one embodiment, the Max_TPSD constraint is not adjusted unless the Down_PPR is above a third threshold PPR, e.g., 0.6.

If the strongest adjacent neighbor cell is not interference overloaded, serving base station 110 increases the Max_TPSD constraint for mobile station 150 in step 330. The Max_TPSD constraint is increased based on relative received pilot powers of the strongest adjacent neighbor cell and the serving cell (or based on relative distances mobile station 150 is from the strongest adjacent neighbor cell and the serving cell). For example, the Max_TPSD constraint may be increased in accordance with the following equation:

$$Max\_TSPD\_current = Max\_TPSD\_previous + PPR2 \times Step\_Up \qquad (5)$$

In one embodiment, the Max_TPSD constraint is not increased unless the Up_PPR is below a fourth threshold PPR, e.g., 0.5.

From steps 325 and 330, flowchart 300 continues to step 335 where serving base station 110 transmits a scheduling grant or other message to mobile station 150 over a forward link control channel, wherein the scheduling grant or other message indicates the new Max_TPSD constraint, i.e., Max_TPSD_current. In step 340, mobile station 150 adjusts its transmit power using well-known power control techniques under the limits of the new Max_TPSD constraint.

Note that, in the embodiment of FIG. 3, the new Max_TPSD constraint is calculated by serving base station 110 and then transmitted to mobile station 150. In an alternate embodiment, serving base station 110 transmits a message to mobile station 150 indicating which adjacent neighbor cells are overloaded. Mobile station 150 can subsequently determine the new Max_TPSD constraint based on this message.

The present invention have been described herein with reference to certain embodiments. This should not be construed to limit the present invention to these embodiments. Other embodiments and combinations of embodiments are possible. For example, instead of adjusting the Max_TPSD constraint, the actual mobile station transmit power may be adjusted using the PPR. Therefore, the spirit and scope of the present invention should not be limited to the description of the embodiments contained herein.

The invention claimed is:

1. A method of adaptively controlling reverse-link transmit power from a mobile station in a wireless communication system, the mobile station operative to receive signals from a serving cell and one or more neighbor cells, the method comprising the steps of:
   receiving, at the mobile station, an indication of overload channels used by the one or more neighbor cells;
   monitoring, at the mobile station, the indicated overload channels for the one or more neighbor cells;
   monitoring, at the base station, pilot signals transmitted from the serving cell and from the one or more neighbor cells;
   upon detecting an overload indicia on a monitored overload channel, evaluating a pilot signal strength for a neighbor cell associated with that overload channel relative to a pilot signal strength for the serving cell; and
   determining a transmit power constraint for the mobile station based on the pilot signal strength evaluation.

2. The method of claim 1, wherein the neighbor cell from which the overload indicia is detected is an adjacent neighbor cell.

3. The method of claim 2, wherein the transmit power constraint is determined based on a pilot signal power ratio corresponding to a ratio between a received pilot signal power of the overloaded adjacent neighbor cell at the mobile station and a received pilot signal power of the serving cell at the mobile station.

4. The method of claim 3, wherein the transmit power constraint is determined by increasing a previous transmit power constraint, an amount of increase being determined as a function of the pilot signal power ratio.

5. The method of claim 2, wherein the overloaded adjacent neighbor cell is an adjacent neighbor cell having a strongest pilot signal strength at the mobile station among all adjacent neighbor cells which are interference overloaded.

6. The method of claim 1, wherein the neighbor cell from which the overload indicia is detected is an adjacent neighbor cell having a strongest pilot signal strength at the mobile station.

7. The method of claim 6, wherein the transmit power constraint is determined using a pilot signal power ratio corresponding to a ratio between a received pilot signal power of the adjacent neighbor cell with the strongest pilot signal strength at the mobile station and a received pilot signal power of the serving cell at the mobile station.

8. The method of claim 7, wherein the transmit power constraint is determined by decreasing a previous transmit power constraint, an amount of decrease being determined as a function of the pilot signal power ratio.

9. The method of claim 1, wherein the transmit power constraint is determined by a processor located at a base station associated with the serving cell and transmitted from the associated base station to the mobile station.

10. The method of claim 1, wherein the transmit power constraint is determined by a processor located at the mobile station and transmitted from the mobile station to a base station associated with the serving cell.

11. The method of claim 1, wherein the transmit power constraint is a maximum transmit power spectral density constraint indicating a maximum allowable transmit power per sub-carrier frequency.

* * * * *